UNITED STATES PATENT OFFICE.

ALBERT L. REINMANN, OF HANOVER, NEW JERSEY.

OPAQUE GLASS.

No. 851,317. Specification of Letters Patent. Patented April 23, 1907.

Application filed June 30, 1906. Serial No. 324,286.

*To all whom it may concern:*

Be it known that I, ALBERT L. REINMANN, a citizen of the United States of America, and a resident of Hanover, county of Morris, and State of New Jersey, have invented certain new and useful Improvements in Opaque Glass, of which the following is a specification.

This invention has reference to the production of a novel opaque glass and the process of making same.

It is the special object of my invention to produce a new opaque glass which is a close imitation of alabaster.

The new product is a white delicately tinted fine grained glass resembling alabaster, but, being a glass, is not soft as the mineral alabaster and therefore may be used for many more purposes particularly exterior decorations and such articles which are subject to atmospheric conditions and moisture. Not only the pure white variety of alabaster may be imitated but the clouded varieties may be also colored for certain purposes.

The new alabaster glass is particularly adapted for making inner and outer globes for arc lights to hide the arc and diffuse the light and for making other bulbs. All kinds of ornaments heretofore made of alabaster may be made of the new glass by blowing, pressing or casting them. For instance some household utensils such as finger-bowls, dishes and vases are made from the glass and in this instance the composition may be tinted with traces of cobaltum or copper oxids. The first named will produce a bluish tint and the second a greenish tint as is well known.

The opaqueness of the novel glass is imparted thereto by admixing finely powdered and sifted asbestos and in some instances a certain percentage of talcum. The asbestos renders the glass imperfectly transparent or translucent and when some talcum is added a more dense and non-transparent glass is obtained which is rather impervious to light. It is essential for obtaining a perfect product to have a certain composition in combination with the asbestos and care must be taken that the glass is fused in a closed pot. In an open pot the opaque quality of the glass may not result because it may be burned out.

In carrying my invention into practice I substantially proceed as follows:—First the various ingredients are weighed and mixed. The composition consists of pure white sand, soda, asbestos, arsenic, niter, and in some instances of talcum. The preferred percentages of the various components are as follows—Pure white sand, 100 pounds, carbonate of soda, preferably of 90%, 42 pounds, finely powdered and sifted asbestos, 20 pounds, arsenic, 1 pound, pure niter, 4 pounds. When these ingredients have been thoroughly mixed they are fused in a closed pot in the usual manner. The cover which closes the pot in the front may be removed from time to time to watch the process of melting. When the composition has been completely transformed into glass and the desired opaqueness obtained the front cover is removed. Now the glass is worked up into the desired articles.

For finger bowls, dishes, vases and the like some cobaltum or copper oxid is admixed in the well known manner for the purpose of obtaining the bluish and greenish tints above referred to. For producing a more dense non-transparent glass up to 20 pounds of finely powdered talcum may be mixed with the percentages of ingredients above stated. The composition is then melted in the closed pot as above described.

In order to economize and make use of the cullet or scrap of the fused alabaster glass remaining from previous days the said scrap is admixed to the composition before it is fused. To the quantity of substances above given such cullet or scrap of alabaster glass may be admixed thereto up to 50 pounds.

It is obvious that the percentages of the various ingredients of which the imitation alabaster or opaque glass is composed may be varied within reasonable limits without departing from the spirit of the invention.

In the described manner I have produced artificial alabaster, white or colored, which does not share the deficiency of the mineral alabaster, that is, its softness. On the contrary my novel substitute alabaster is hard because it is a glass and therefore may be used for a great many more purposes than the mineral alabaster and lasts longer. The articles made from the artificial alabaster are easily produced by blowing or pressing them in the same manner in which glass is worked up.

Having thus described my invention I claim as new and desire to secure by Letters Patent:—

1. The composition for artificial alabaster an opaque glass consisting of pure white sand, soda preferably of 90%, finely powdered and sifted asbestos, arsenic, and niter substantially in the proportion specified.

2. The composition for artificial alabaster an opaque glass consisting of pure white sand, soda preferably of 90%, finely powdered and sifted asbestos, arsenic, and niter substantially in the proportion specified, and tinting metallic oxids.

3. The composition for artificial alabaster an opaque glass consisting of about 100 pounds of pure white sand, 42 pounds of soda preferably of 90%, 20 pounds of finely powdered and sifted asbestos, and 4 pounds of niter.

4. The composition for artificial alabaster an opaque glass consisting of 100 pounds of pure white sand, 42 pounds of soda preferably of 90%, 20 pounds of finely powdered and sifted asbestos, and about 20 pounds of finely powdered talcum.

5. As an artificial alabaster, an opaque glass, derived from pure white sand, soda, finely powdered and sifted asbestos, arsenic, and niter and existing as a white delicately tinted fine grained glass which is imperfectly transparent or translucent.

6. As an artificial alabaster, an opaque glass, derived from pure white sand, soda, finely powdered and sifted asbestos, arsenic, and niter and coloring metallic oxids, and existing in the form of an imperfectly transparent or translucent tinted glass.

7. As an artificial alabaster, an opaque glass, derived from about 100 pounds of pure white sand, 42 pounds of soda preferably of 90%, 20 pounds of finely powdered and sifted asbestos, 1 pound of arsenic and 4 pounds of niter.

8. As an artificial alabaster an opaque glass, derived from about 100 pounds of pure white sand, 42 pounds of soda preferably of 90%, 20 pounds of finely powdered and sifted asbestos, 1 pound of arsenic, 4 pounds of niter, and about 20 pounds of finely powdered talcum.

Signed at Madison, N. J., this 28th day of June, 1906.

ALBERT L. REINMANN.

Witnesses:
ALEXANDER EAGLES,
ROSE J. NEUFIELD.